(12) United States Patent
Kinsley

(10) Patent No.: US 7,751,263 B2
(45) Date of Patent: Jul. 6, 2010

(54) DATA RETENTION KILL FUNCTION

(75) Inventor: Tom Kinsley, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/352,485

(22) Filed: Jan. 12, 2009

(65) Prior Publication Data

US 2009/0153181 A1 Jun. 18, 2009

Related U.S. Application Data

(63) Continuation of application No. 11/490,215, filed on Jul. 20, 2006, now Pat. No. 7,477,554, which is a continuation of application No. 10/973,208, filed on Oct. 26, 2004, now Pat. No. 7,164,611.

(51) Int. Cl.
*G11C 7/00* (2006.01)

(52) U.S. Cl. .............. 365/195; 365/185.04; 365/189.29

(58) Field of Classification Search ................. 365/195, 365/185.04, 185.29, 196, 185.22, 185.01, 365/189.08
See application file for complete search history.

(56) References Cited

U.S. PATENT DOCUMENTS

| | | | |
|---|---|---|---|
| 4,393,515 A * | 7/1983 | de Neumann | ............... 398/171 |
| 4,590,552 A | 5/1986 | Guttag et al. | |
| 4,864,542 A | 9/1989 | Oshima et al. | |
| 5,432,950 A | 7/1995 | Sibigtroth | |
| 5,500,949 A | 3/1996 | Saito | |
| 5,526,271 A * | 6/1996 | Abumehdi | .................. 705/403 |
| 5,559,989 A | 9/1996 | Sourgen et al. | |
| 5,657,272 A | 8/1997 | Sato | |
| 5,978,915 A | 11/1999 | Lisart et al. | |
| 6,076,149 A | 6/2000 | Usami et al. | |
| 6,101,586 A | 8/2000 | Ishimoto et al. | |
| 6,233,201 B1 | 5/2001 | Sone | |
| 6,324,103 B2 * | 11/2001 | Hiraki et al. | ........... 365/189.05 |
| 6,331,784 B1 | 12/2001 | Mason et al. | |
| 7,083,107 B2 * | 8/2006 | Sakamoto et al. | ........... 235/492 |
| 7,164,611 B2 | 1/2007 | Kinsley | |
| 7,477,554 B2 | 1/2009 | Kinsley | |
| 2002/0149468 A1 | 10/2002 | Carrender et al. | |
| 2005/0283566 A1 | 12/2005 | Callaghan | |

* cited by examiner

*Primary Examiner*—Gene N. Auduong
(74) *Attorney, Agent, or Firm*—Fletcher Yoder PC

(57) ABSTRACT

Various data protection techniques are provided. In one embodiment, a method includes manufacturing a memory component of an electronic system. Manufacturing the memory component may include disposing a memory array on a substrate and coupling a control circuit to the memory array. The control circuit may be configured to selectively prevent access to data stored within the memory array upon removal of the memory component from the electronic system. Various additional methods, devices, and systems are also provided.

22 Claims, 8 Drawing Sheets

DATA RETENTION KILL FUNCTION

CROSS-REFERENCE TO RELATED APPLICATIONS

This application is a continuation of U.S. application Ser. No. 11/490,215, filed on Jul. 20, 2006, and issued as U.S. Pat. No. 7,477,554 on Jan. 13, 2009, which is a continuation of U.S. application Ser. No. 10/973,208, filed on Oct. 26, 2004, and issued as U.S. Pat. No. 7,164,611 on Jan. 16, 2007.

BACKGROUND OF THE INVENTION

1. Field of the Invention

The present invention relates generally to electronic memory devices and, more particularly, to a device and method for increasing security of data stored in memory devices.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Microprocessor-controlled circuits are used in a wide variety of applications. Such applications include personal computers, control systems, telephone networks, and a host of other consumer products. A personal computer or control system includes various components, such as microprocessors, that handle different functions for the system. By combining these components, various consumer products and systems may be designed to meet specific needs. Microprocessors are essentially generic devices that perform specific functions under the control of software programs. These software programs are generally stored in one or more memory devices that are coupled to the microprocessor and/or other peripherals.

Semiconductor memory devices, such as dynamic random access memory (DRAM) devices, are widely used for storing data in systems such as computer systems. A DRAM memory cell typically includes an access device such as a field effect transistor (FET) coupled to a storage device such as a capacitor. The access device allows the transfer of charged electrons to and from the storage capacitor, thereby facilitating read and write operations in the memory device. The memory cells are typically arranged in a number of rows and columns to provide a memory array. Each memory cell in the array is connected to at least one row or "wordline" and at least one column or "bitline." Generally speaking, the gate terminal of the access device may be coupled to the wordline while at least one of the remaining terminals (e.g. drain/source) is coupled to the bitline. The other terminal (drain/source) may be coupled to the capacitor. When a voltage is applied to the wordline, the gate of the access device opens and charged particles flow from the bitline to the storage device or vice versa, depending on the mode of operation of the memory cell (e.g. read or write).

As the use of semiconductor memory devices has become ubiquitous, many applications have arisen in which the security of the data stored by these same devices is a pressing concern. Frequently, DRAM devices are used to store sensitive data in highly secure applications, because the data stored in such devices must be constantly refreshed in order to maintain the data. Failure to refresh the data in a timely fashion results in eventual loss of the data. However, even when the data is not refreshed, the capacitors that store charge in a DRAM device may continue to do so for some length of time after the latest refresh operation, even if the device is deactivated or powered-down. Though many DRAM devices are specified to retain data for 64 ms, depending upon the operating voltage and temperature, such data is frequently retained for hundreds of milliseconds and may even be retained for times in excess of a full second. While the data may be eventually lost after failure to refresh, this extended period in which the data remains after deactivation of the device presents a security risk that the data will be recovered by reapplying power to the device before the capacitive charge of each memory cell sufficiently dissipates.

This extended storage of data beyond the time of deactivation may be undesirable in a wide range of applications, but is particularly undesirable in military applications and the case of devices intended to be replaced in the field. In this case, if an electronic field replaceable unit (FRU) is removed from a system the data stored in a memory device of that FRU may be accessible if power is restored within a short period of time. Such an event may result in critical data being compromised. Further, some FRUs may actually have capacitive characteristics that provide partial power to the memory device even after the unit has been removed from a power supply, extending the amount of time in which the data could be compromised. In other applications, it may be desirable to destroy or inhibit access to data upon demand, even when the FRU remains connected to the original system.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Various embodiments of the present invention generally relate to secure memory devices, systems, and methods. More particularly, in certain embodiments, a kill function logic device may be coupled to a memory array of the memory device and adapted to selectively prevent access to the stored data. Access may be prevented in a variety of fashions, including disabling read access to the memory array, purging the stored data from the memory array, disabling the memory device partially or entirely, or the like. Additionally, for highly sensitive applications, a circuit may be configured to automatically purge data from the memory array upon application of power to, or removal of power from, the memory device.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
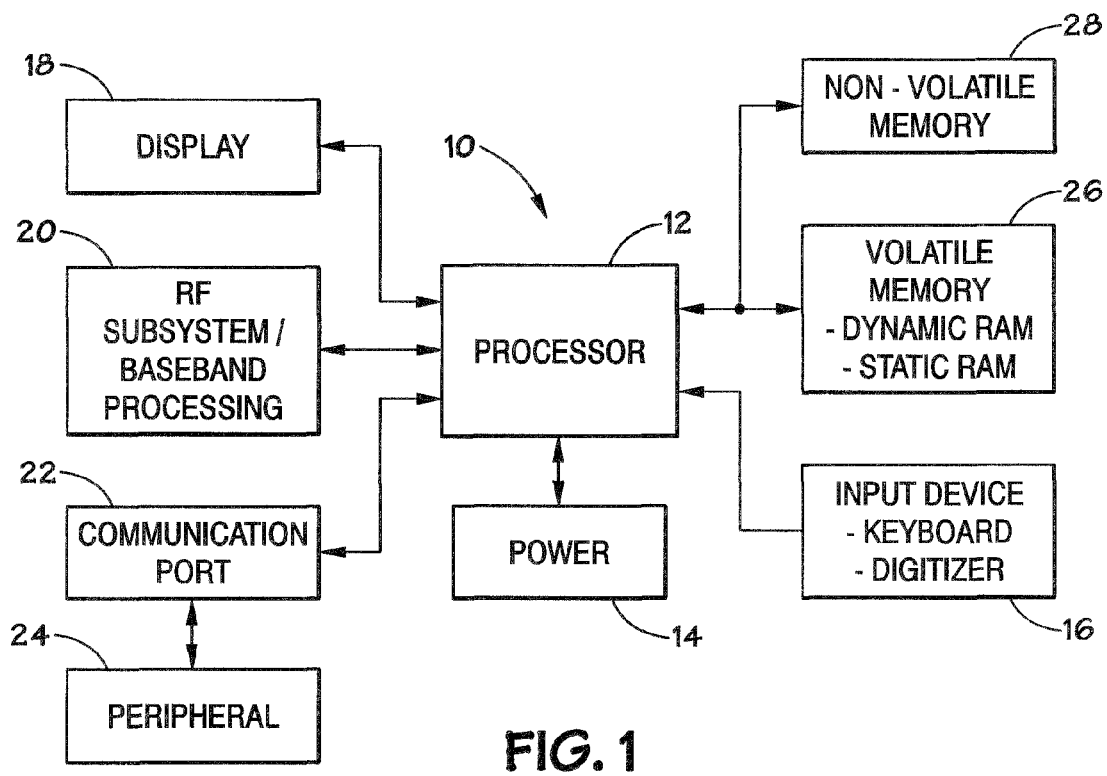
FIG. 1 is a block diagram of an electronic system containing integrated circuit devices that may employ embodiments of the present invention.

Turning now to the drawings, FIG. 1 is a block diagram of an electronic system containing integrated circuit devices that may employ embodiments of the present invention. The electronic device or system, which is generally referred to by the reference numeral 10, may be any of a variety of types such as a computer, pager, cellular phone, personal organizer or the like. In a processor-based device, a processor 12, such as a microprocessor, may control the operation of system functions and requests. The processor 12 may be coupled to various types of memory devices to facilitate its operation. For example the processor 12 may be connected to a volatile memory 26 and a non-volatile memory 28. The volatile memory 26 may comprise a variety of memory types, such as static random access memory ("SRAM"), dynamic random access memory ("DRAM"), first or second generation Double Data Rate memory ("DDR1" or "DDR2" respectively), or the like. The non-volatile memory 28 may comprise various types of memory such as electrically programmable read only memory ("EPROM"), and/or flash memory or the like.

The system 10 may include a power supply 14, which may comprise a battery or batteries, an AC power adapter and/or a DC power adapter. Various other devices may be coupled to the processor 12 depending on the functions that the system 10 performs. For example, an input device 16 may be coupled to the processor 12 to receive input from a user. The input device 16 may comprise a user interface and may include buttons, switches, a keyboard, a light pen, a mouse, a digitizer and/or a voice recognition system or the like. An audio or video display 18 may also be coupled to the processor 12 to provide information to the user.

A communications port 22 may be adapted to provide a communication interface between the electronic system 10 and peripheral devices 24. The peripheral device 24 may include a docking station, expansion bay or other external component. Furthermore, an RF sub-system/baseband processor 20 may be coupled to the processor 12 to provide wireless communication capability.

The processor 12, the non-volatile memory 28, and the volatile memory 26 may be implemented as one or more integrated circuit components. Also, the processor 12, the non-volatile memory 28, and the volatile memory 26 are examples of integrated circuit components that may include sense amplifier circuits constructed in accordance with embodiments of the present invention.

Figure 2A:
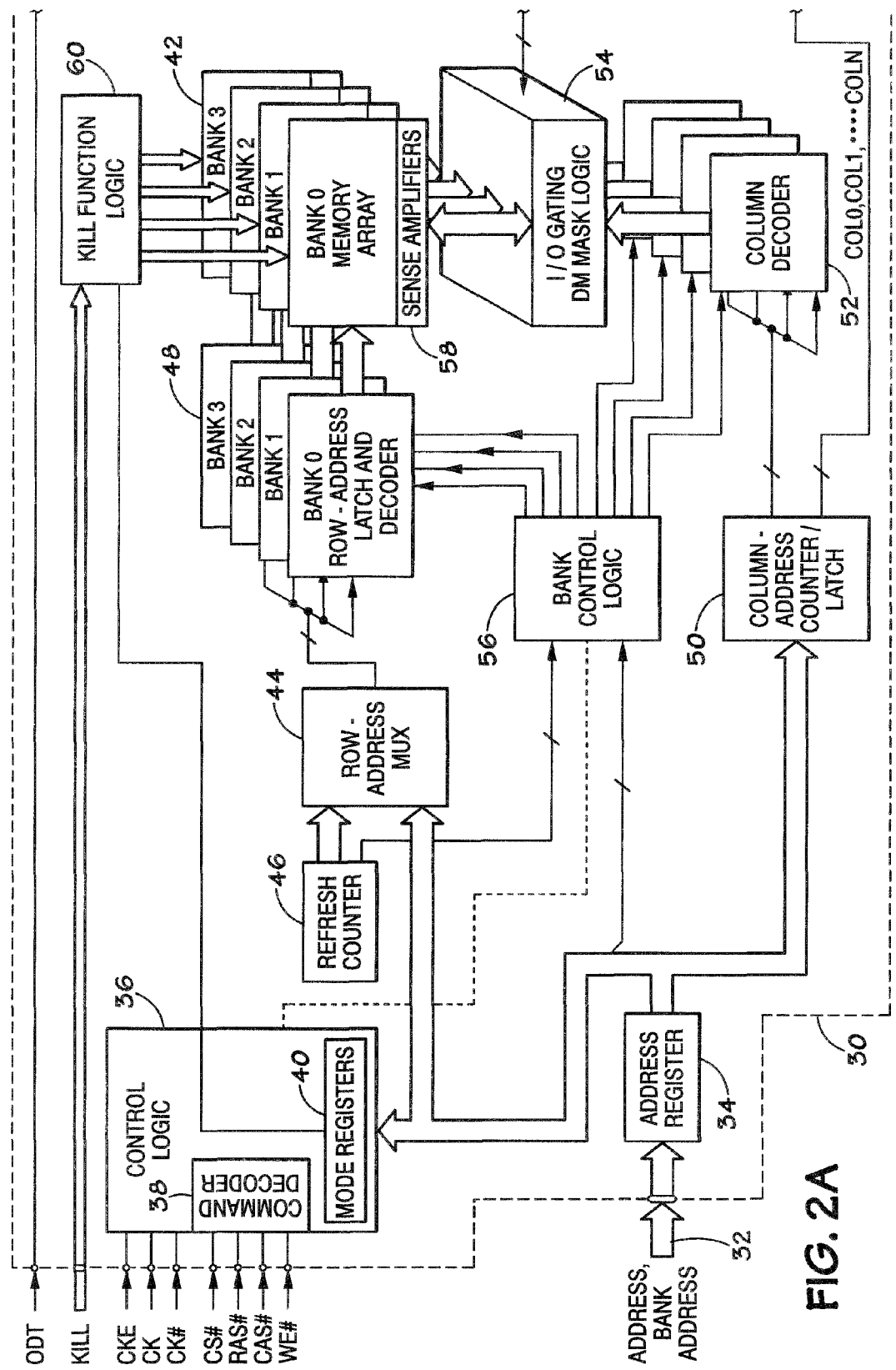
FIGS. 2A and 2B illustrate a block diagram of an exemplary memory device in accordance with the present techniques.
Figure 2B:
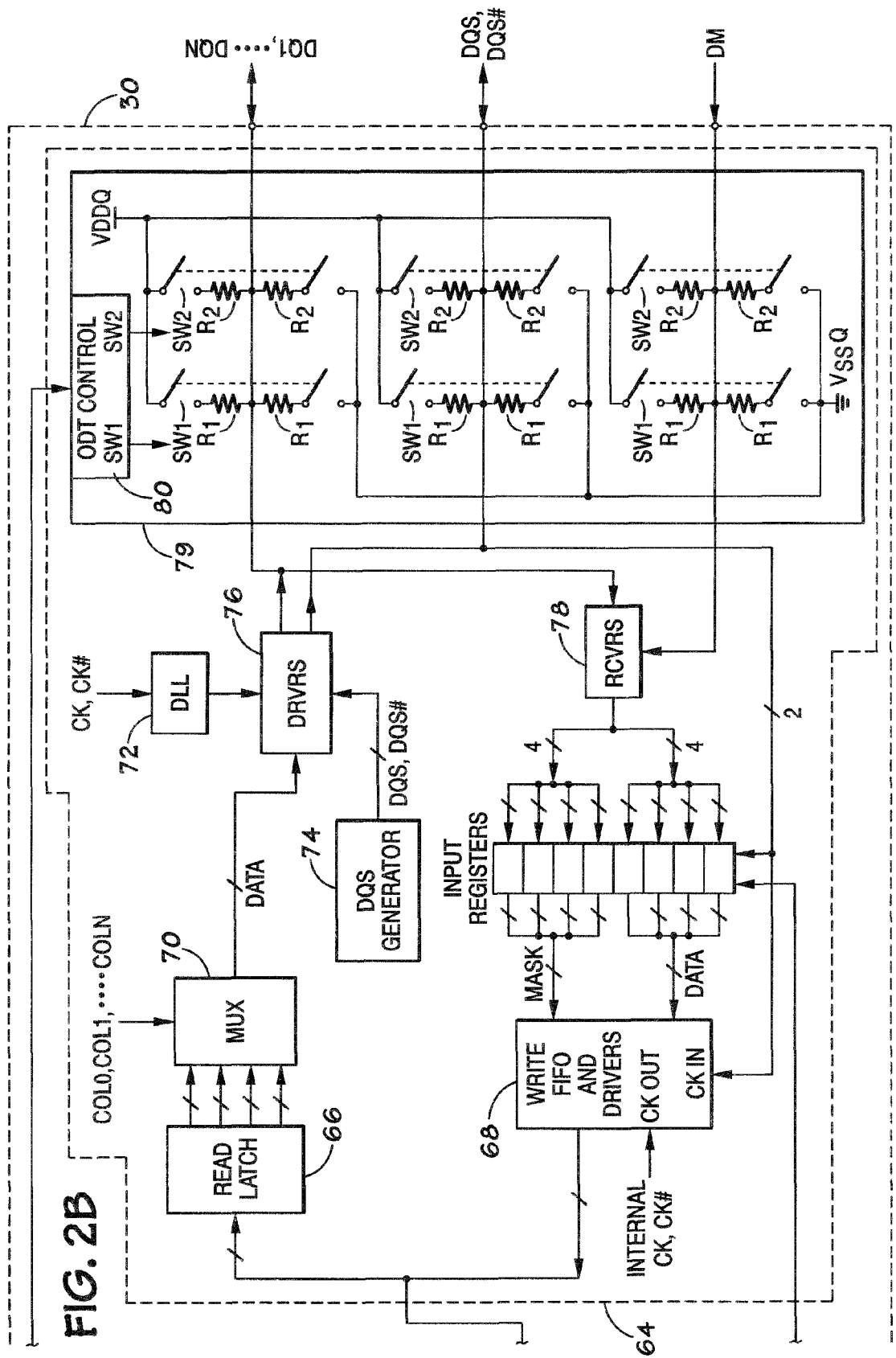

FIGS. 2A and 2B illustrate a block diagram depicting an exemplary embodiment of a DRAM, which may be one or more bits in width, such as ×4, ×8, ×16, or the like. The description of the DRAM 30 has been simplified for purposes of illustrating a DRAM memory device and it not intended to be a complete description of all features of a DRAM. The present invention is not limited to DRAMs, and is equally applicable to other memory devices, including Double Data Rate memory devices, flash memory devices, or the like. Those skilled in the art will recognize that a wide variety of memory devices may be implemented in accordance with aspects of the present techniques.

Control, address, and data information provided over a memory bus are represented by individual inputs to the DRAM 30. As illustrated, these individual representations include address lines 32 and various discrete lines directed to control logic 36. The DRAM 30 interfaces with, for example, a processor 12, as shown in FIG. 1, through address lines 32 and data lines, which may convey a number of signals, such as a data signal DQ, a data strobe signal DQS, and a data mask signal DM. Alternatively, the DRAM 30 may interface with a DRAM controller, a microcontroller, a chip set, or other electronic system. Address lines 32 may be coupled to the DRAM 30 through an address register 34. The processor 12 may also provide a number of control signals to the DRAM 30. Such signals may include row and column address strobe signals RAS and CAS, a write enable signal WE, a clock signal CK, a clock enable signal CKE, an on-die termination signal ODT, and other conventional control signals understood in the art. The control logic 36, which may include a command decoder 38 and mode registers 40, is used to control the many available functions of the DRAM 30. In addition, various control circuits and signals not detailed herein initiate and synchronize the DRAM 30 operation as known to those skilled in the art. The DRAM 30 may be further configured to receive a kill signal as illustrated in FIGS. 2A and 2B and discussed more fully below.

As is well known in the art, the DRAM 30 includes a memory array 42 which comprises rows and columns of addressable memory cells. Each memory cell in a row is coupled to a wordline. Additionally, each memory cell in a column is coupled to a bitline. Each cell in the memory array 42 includes a storage capacitor and an access transistor as is conventional in the art.

A row address multiplexer 44 and a row address latch and decoder 48 receive and decode row addresses from row address signals provided on the address lines 32. Each unique row address corresponds to a row of cells in the memory array 42. The row address latch and decoder 48 includes a wordline driver, an address decoder tree, and circuitry which translates a given row address received from row address multiplexer 44 and selectively activates the appropriate wordline of the memory array 42 via the wordline drivers. The DRAM 30 may also include a refresh counter 46 to facilitate refreshing of the data stored in the memory array 42.

A column address counter/latch 50 and a column decoder 52 receive and decode column address signals provided on the address lines 32. The column decoder 52 also determines when a column is defective and the address of a replacement column. The column decoder 52 is coupled to sense amplifiers 58, via I/O gating DM mask logic 54 in the present illustration. The sense amplifiers 58 are coupled to complimentary pairs of bitlines of the memory array 42. Additionally, bank control logic 56 may be employed to coordinate the function of row address latch decoder 48 and column decoder 52.

In accordance with embodiments of the present techniques, a kill function logic device 60 may be coupled to the memory array 42. The kill function logic device 60 may be a memory device component (as illustrated in FIGS. 2A and 2B), or may instead be independent of the memory device. The kill function logic device 60 may interact with the memory array 42 to selectively prevent access to secure data stored within the memory array 42. As would be understood by one skilled in the art, kill function logic device 60 may be configured for any combination of hardware and/or software control. Upon some triggering event, such as removal of a field replaceable unit from a system, a change in the voltage supplied to the DRAM 30 or the kill function logic device 60, or receipt of a "kill command signal," the kill function logic device 60 may initiate one or more security measures to protect the security of the data stored. Such security measures may include, but are not limited to, disabling read access to some or all of the memory array 42 and/or erasing all or some portion of the data stored within the memory array 42 in an accelerated fashion as described below with respect to FIG. 8. Disabling read access to (and/or erasing in an accelerated manner) the contents of memory array 42 may be carried out in a fashion similar to that described below with respect to FIGS. 6-8, for example.

Alternatively, the kill function logic device 60 may instead disable a memory device, such as a hard drive, a flash memory, or the DRAM 30, as described further below. The memory device, DRAM 30 in the present illustration, may be disabled by disconnecting one or more data paths within the device. Such a disconnecting may be performed in a number of ways, and may include the use of switches or fusible links. Depending on the method used, disablement of the memory device may be reversible, as may be the case with switches, or may be permanent, such as in the case of fusible links.

The kill function logic device 60 may also be configured to receive an input "kill command signal" that instructs the kill function logic device 60 to initiate one or more of the presently disclosed security measures. A kill signal may originate external to a memory device and be delivered through a pin, which may be a kill pin dedicated to delivering such a signal. Alternatively, the kill signal may originate within the memory device. The kill command signal may or may not instruct the kill function logic device 60 on the security measure to be taken and the portion of the memory array to secure. Additionally, kill function logic device 60 may be configured to monitor the operation of a memory device, such as the DRAM 30, and initiate security measures in response to some input to, or change in the operating conditions of, the device. Such triggering events may include a change in the supply voltage, a change in the input level on an input pin, or failure of an electronic system to provide a specific authentication sequence.

Further, a register of the memory device may be configured to allow the kill function logic device 60 to be enabled or disabled by a security bit, to set the authentication sequence to be required from an electronic system, and to set various trigger points in voltage or signal strength that would cause the kill function logic device 60 to commence various security procedures disclosed herein. Such configurability of defined trigger points allows for greater flexibility in using a memory device with a kill function logic device 60 in a wide range of applications.

Also depicted in FIGS. 2A and 2B is an input/output (I/O) portion 64 of the DRAM 30. As will be understood by those in the art, the I/O portion 64 may include a variety of components to assist in the transmission of data to and from the DRAM 30. As illustrated, such components may include a read latch 66, write FIFO and drivers 68, a delay lock loop 72, a DQS generator 74, drivers 76, receivers 78, an on die termination circuit 79 (which may include an ODT control 80, termination switches, and resistors), input registers, or any other similar components known in the art.

As stated above, the description of the DRAM 30 has been simplified for purposes of illustrating the present invention and is not intended to be a complete description of all features of a DRAM. Further, those skilled in the art will recognize that a wide variety of memory devices including but not limited to DRAMs, EEPROMs, and hard disk drives, may be used in the implementation of the present invention. The DRAM implementation described herein is illustrative and is not intended to be exclusive or limiting.

Figure 3:
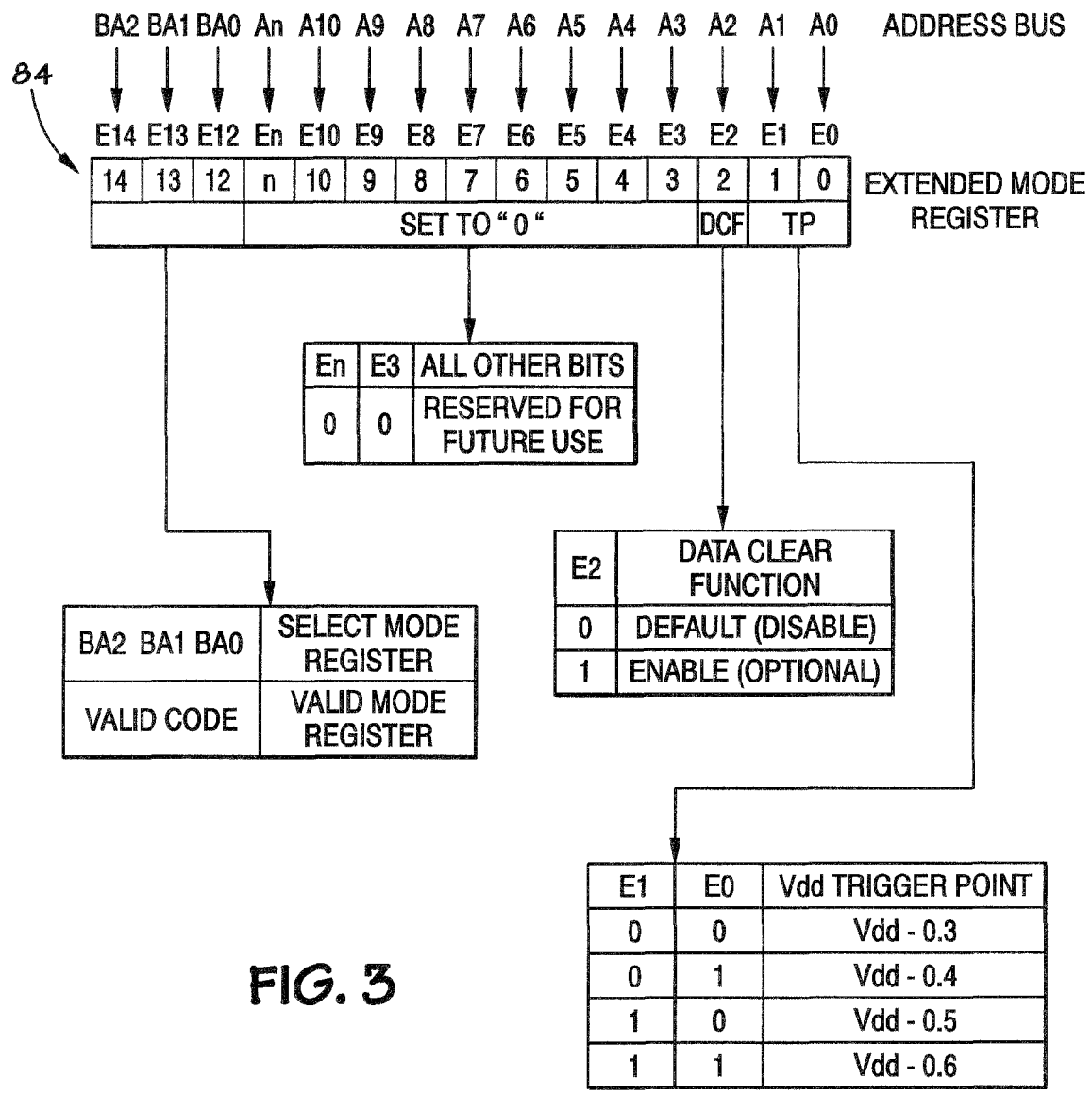
FIG. 3 illustrates an exemplary extended mode register configured in accordance with the present techniques.

FIG. 3 depicts an exemplary mode register for configuration of the kill function logic device 60 of FIGS. 2A and 2B. As shown in FIG. 3, the individual bits of the extended mode register 84 may be altered to configure various properties of the kill function logic device 60. In the present exemplary embodiment, bits E0 and E1 are used to set the supply voltage trigger point at which the kill function logic device 60 is to implement security processes. Bit E2 is devoted to enabling or disabling the data clear function of the kill function logic device 60, while bits E12-E14 are used to select a desired mode register. All other bits depicted in FIG. 3 are reserved for other functions not associated with the kill functions. As will be understood by those in the art, bit assignments provided in this figure are for illustrative purposes only; other functions could instead or additionally be tied to the bits input to the extended mode register 84.

Figure 4:
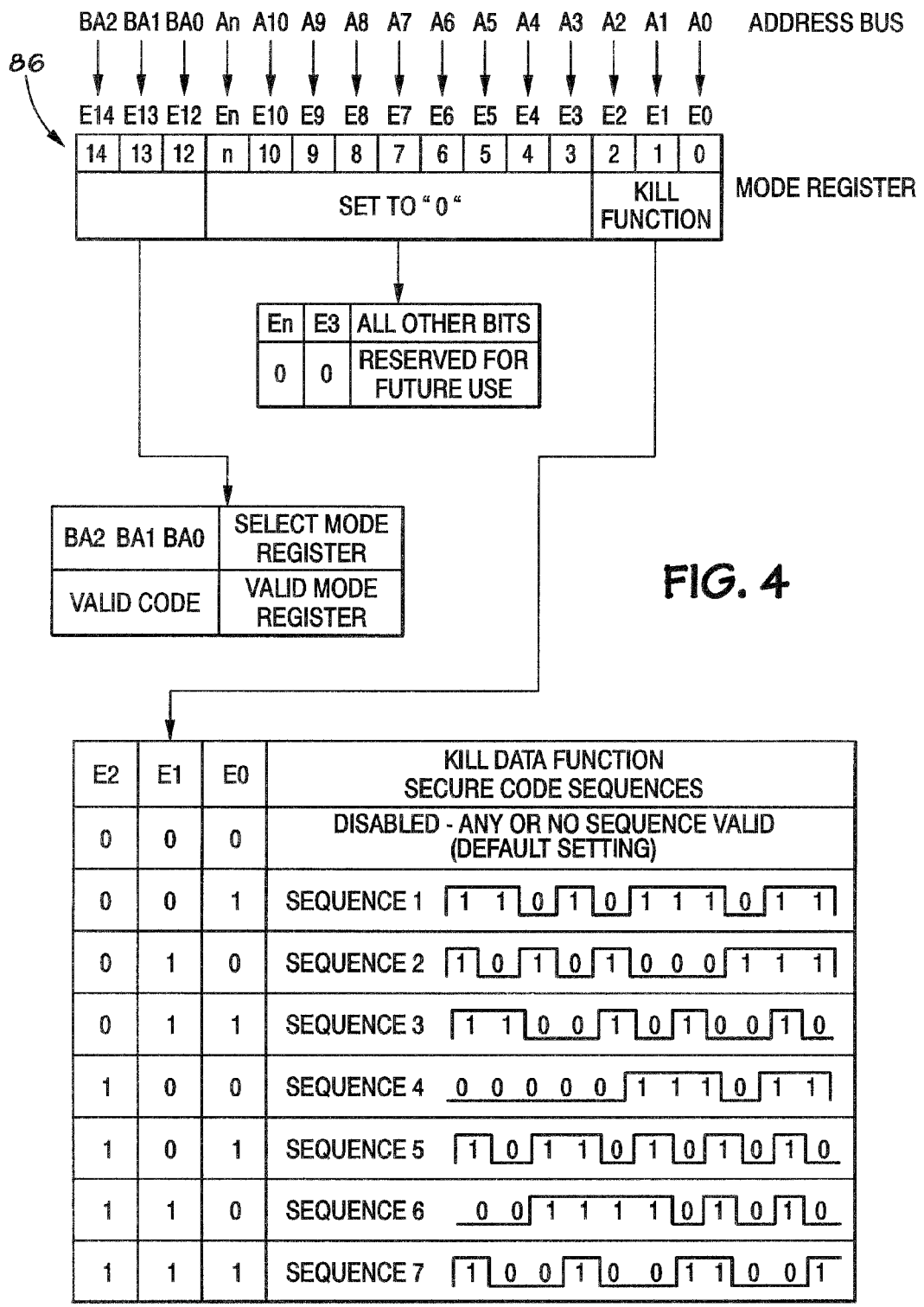
FIG. 4 illustrates an exemplary method for programming a security code into a secure device in accordance with the present techniques.

An exemplary method for programming a security code into a secure device in accordance with the present techniques is provided in FIG. 4. In this example, each permutation of bits E0-E2 corresponds to an exemplary secure code sequence to be required of an electronic system attempting to access the memory device. If the electronic system fails to furnish the proper code, security measures may be taken in accordance with the present techniques. Similar to FIG. 3, bits E12-E14 are reserved for selecting the desired mode register 86, while all other bits are reserved for other functions not associated with the kill functions.

Figure 5:
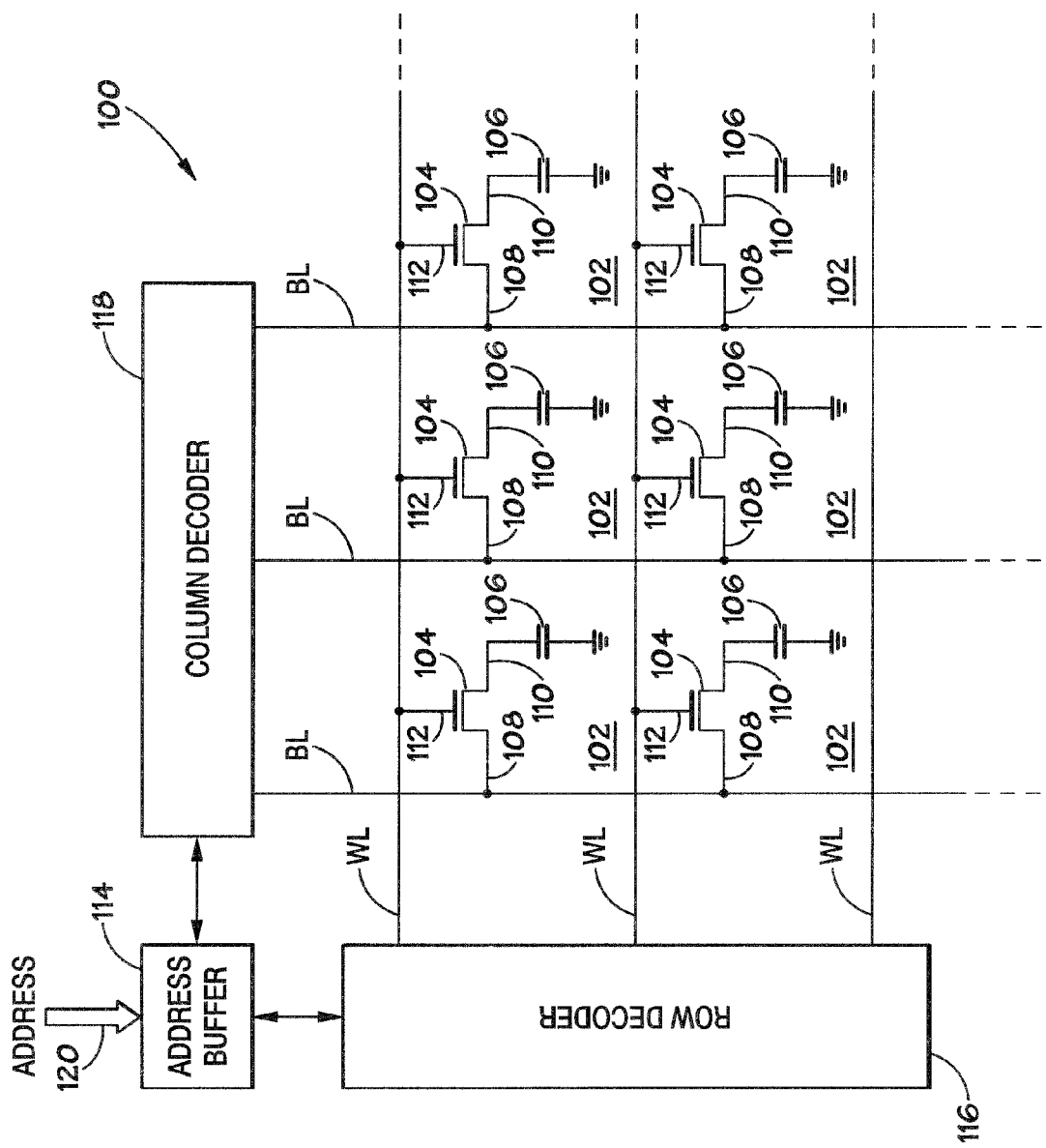
FIG. 5 is a partial schematic of a portion of a memory array employed in accordance with the present techniques.

FIG. 5 is an exemplary schematic illustration of a portion of an integrated circuit, such as a memory device 100, incorporating an array of memory cells which may be fabricated in accordance with the techniques described herein. The memory device 100 may be, for example, a dynamic random access memory (DRAM) device. In the exemplary embodiment, the memory device 100 includes a number of memory cells 102 arranged in a grid pattern comprising a number of rows and columns. As can be appreciated, the number of memory cells (and corresponding rows and columns) may vary depending on system requirements and fabrication technology.

Each memory cell 102 includes an access device and a storage device as previously discussed. In the present exemplary embodiment, the access device comprises a field-effect transistor (FET) 104 and the storage device comprises a capacitor 106. The access device is implemented to provide controlled access to the storage device. In the exemplary memory cell 102, the FET 104 includes a drain terminal 108 and a source terminal 110, along with a gate terminal 112 for controlling conduction between the drain and source terminals 108, 110. The storage device, such as the capacitor 106, is coupled to one of the drain/source terminals 108, 110. Here, the capacitor 106 is coupled to the source 110. The terminal of the capacitor 106 that is not coupled to the FET 104 may be coupled to a ground plane, or to some other reference point and/or level.

It should be noted that although the above description depicts the terminal of the access device that is coupled to the capacitor 106 as the source 110 and the other non-gate terminal of the access device as the drain 108, during read and write operations, the FET 104 may be operated such that each of the terminals 108 and 110 operates at one time or another as a source or a drain. Accordingly, for purposes of further discussion it should be recognized that whenever a terminal is identified as a source or a drain, it is only for convenience and that in fact during operation of the FET 104 either terminal could be a source or a drain depending on the manner in which the FET 104 is being controlled by the voltages applied to the terminals 108, 110, and 112 of the FET 104.

As previously described, the memory array is arranged in a series of rows and columns. To implement the data storage capabilities in the memory cell 102, an electrical charge is placed on the drain 108 of the FET 104 via a bitline (BL). By controlling the voltage at the gate 112 via the wordline (WL), a voltage potential may be created across the FET 104 such that the electrical charge at the drain 108 can flow to the capacitor 106. As can be appreciated, by storing an electrical charge in the capacitor 106, the charge may be interpreted as a binary data value in the memory cell 102. For instance, for a single-bit storage device, a positive charge above a known threshold voltage may be interpreted as a binary "1." If the charge in the capacitor 106 is below the threshold value, a binary value of "0" is said to be stored in the memory cell 102.

As previously described, the bitlines BL are used to read and write data to and from the memory cells 102. The wordlines WL are used to activate the FET 104 to access a particular row of a memory cell 102. Accordingly, the memory device 100 includes an address buffer 114, row decoder 116, and column decoder 118. As can be appreciated, the address buffer 114 controls each of the row decoder 116 and the column decoder 118. The row decoder 116 and column decoder 118 selectively access the memory cells 102 in response to address signals that are provided on the address bus 120 during read, write, and refresh operations. The address signals are typically provided by an external controller such as a microprocessor or other memory controller. The column decoder 118 may also include sense amplifiers and input/output circuitry to further enable data to be read to and from the memory cell 102 via the bitlines BL, as described previously with respect to FIGS. 2A and 2B.

In one exemplary mode of operation, the memory device 100 receives an address of a particular memory cell 102 at the address buffer 114. The address buffer 114 identifies one of the wordlines WL of the particular memory cell 102 corresponding to the requested address and passes the address to the row decoder 116. The row decoder 116 selectively activates the particular wordline WL to activate the FETs 104 of each memory cell 102 that is connected to the selected wordline WL. The column decoder 118 selects the bitline (or bitlines) BL of the memory cell 102 corresponding to the requested address. For a write operation, data received by input/output circuitry is coupled to the selected bitline (or bitlines) BL and provides for the charge or discharge of the capacitor 106 of the selected memory cell 102 through the FET 104. The charge corresponds to binary data, as previously described. For a read operation, data stored in the selected memory cell 102, represented by the charge stored in the capacitor 106, is coupled to the selected bitline (or bitlines) BL, is amplified by the sense amplifier, and a corresponding voltage level is provided to the input/output circuit in the column decoder 118.

Figure 6:
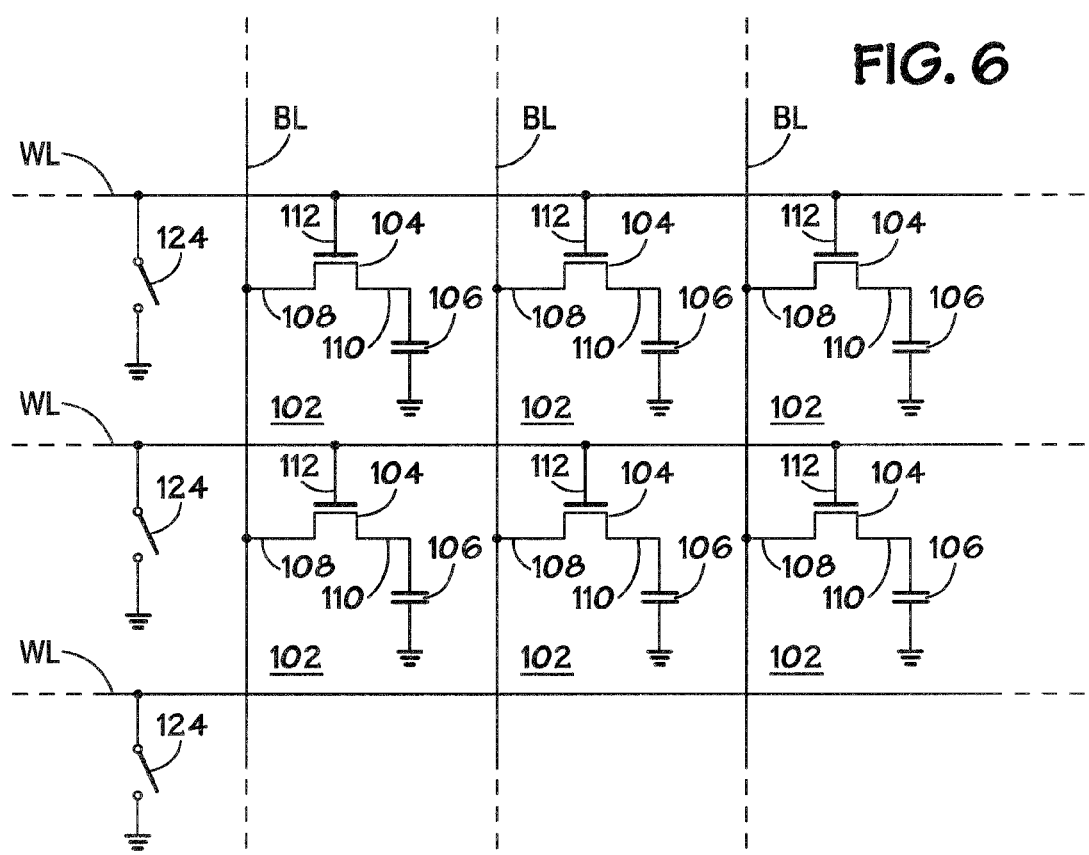
FIG. 6 illustrates one exemplary technique for disabling a memory device in accordance with the present embodiments.
Figure 7:
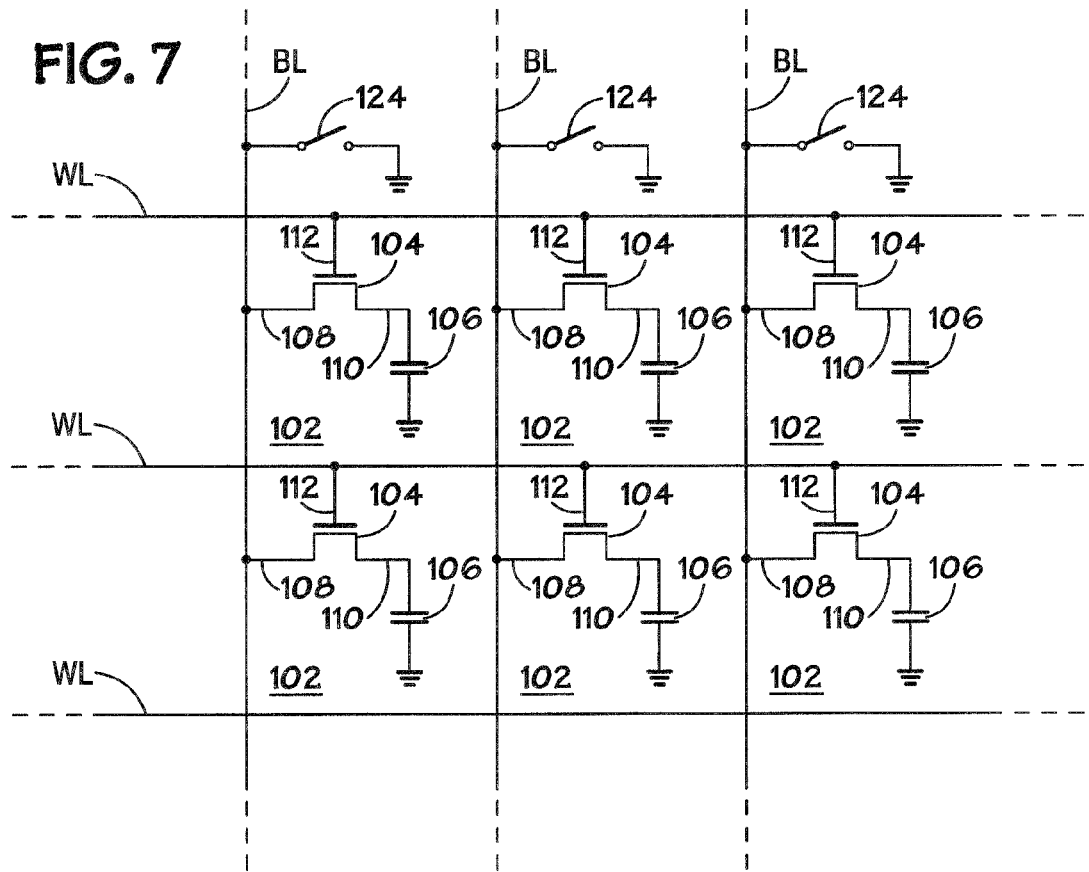
FIG. 7 illustrates an alternative exemplary technique for disabling a memory device in accordance with the present embodiments.

FIG. 6 and FIG. 7 are exemplary methods for disabling read access to a portion of a DRAM memory array, such as the array depicted in FIG. 5. As in FIG. 5, each individual memory cell 102 includes a FET 104, with terminals 108, 110, and 112, and a capacitor 106. With respect to FIG. 6, one or more switches 124 provide the capability to electrically ground one or more wordlines WL of the memory array. The switches 124 may be controlled by the kill function logic device 60 described above with respect to FIGS. 2A and 2B. Alternatively, the switches 124 may be controlled by another circuit or device. In accordance with still another exemplary embodiment, the switches 124 may operate independently, such as through reverse-biasing or other techniques known in the art. Thus, in accordance with embodiments of the present techniques, the wordlines WL may be coupled to ground in response to an event. The grounding of a wordline WL prevents any transistor 104 coupled to the wordline WL from activating, which, in turn, prevents the detection of a charge on the respective capacitor 106. Consequently, though the data stored in the memory array remains intact, the data stored in the memory cells 102 connected to the grounded wordline WL cannot be accessed.

A similar exemplary method for disabling read access to a portion of a memory array is illustrated in FIG. 7. In this embodiment, the bitlines BL are capable of being electrically grounded by one or more switches 124. Grounding of these bitlines BL prevents readability of the data stored in the memory array by preventing charge stored on the capacitors 106 from reaching a sense amplifier, such as the sense amplifier 58 of FIGS. 2A and 2B, which detects and interprets the charge on the line. Instead, even if the transistors 104 are activated by powering a wordline WL, the capacitors 106 would discharge, and the charge would travel on the grounded bitline BL to ground instead of to the sense amplifier. As in FIG. 6, this would also prevent the contents of the cells from being read.

Figure 8:
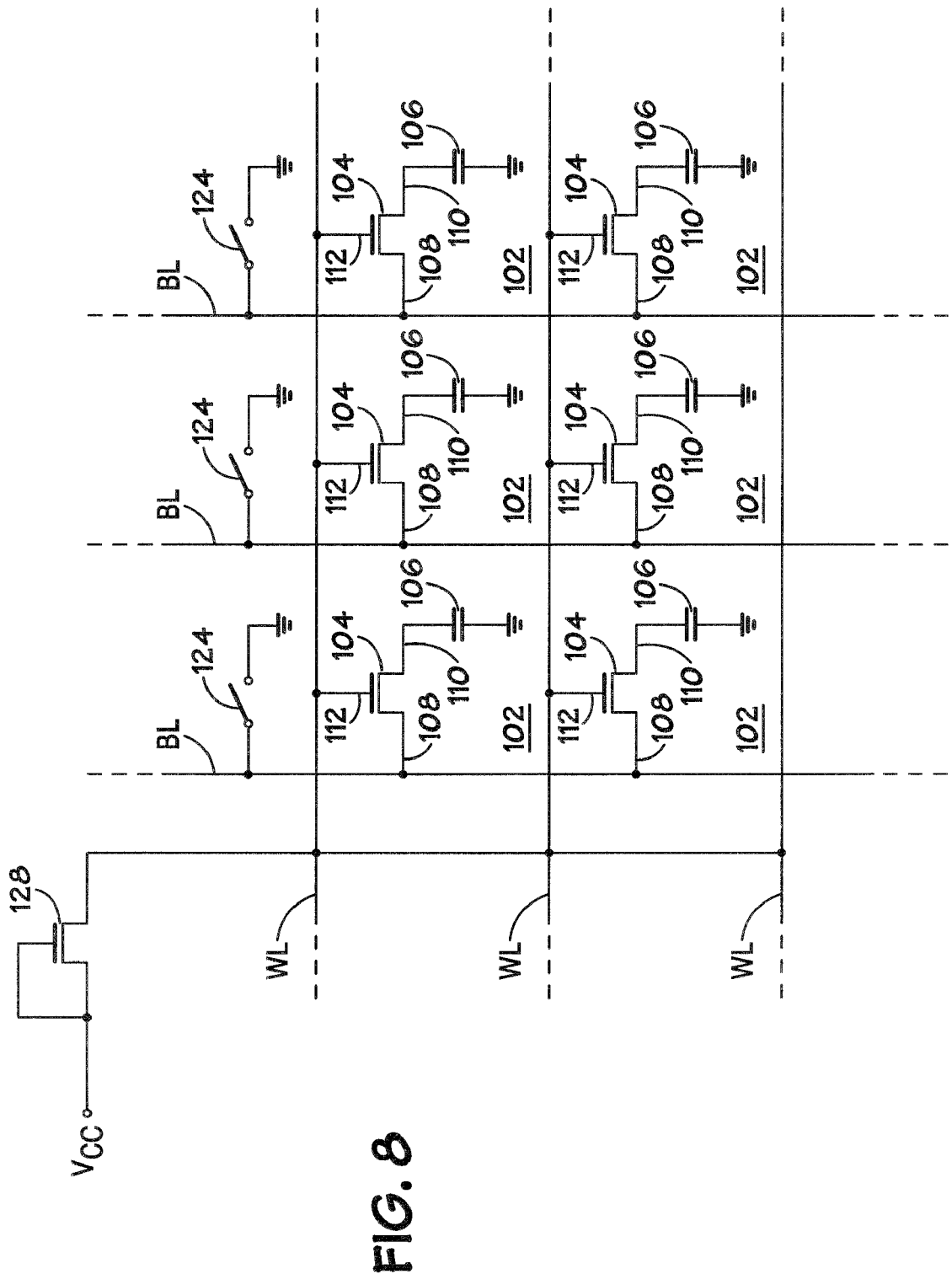
FIG. 8 illustrates an exemplary technique for purging data stored in a memory device in accordance with the present embodiments.

For further data security, instead of disabling read access to the memory array, as discussed with reference to FIGS. 6 and 7, the data stored in the memory array may be erased in an accelerated fashion. One such technique for accelerated erasing of the data stored in a portion of a memory array is shown in FIG. 8. As described in detail with respect to FIG. 5, and similar to FIGS. 6 and 7, a portion of a memory array is shown, including memory cells 102 that include transistors 104 and capacitors 106. In accordance with the present exemplary method for erasing the data stored within the memory array, the bitlines BL are electrically shorted to ground by switches 124 while driving the wordlines WL. As shown in the present illustration, the wordlines WL may be driven by a voltage $V_{cc}$, which may be switched on and off as desired. Also, as will be understood by one skilled in the art, a transistor 128 is electrically coupled between a power source and the wordlines WL to reduce the magnitude of potential power spikes that would otherwise damage the circuitry of the memory array. Powering the wordlines WL activates the transistors 104 and discharges the capacitors 106. The charge is disposed onto the bitlines BL and then dissipated to ground. Resultantly, the data stored in the associated memory cells 102 may be purged more quickly (on the order of nanoseconds, for instance) than in the standard method of terminating refresh operations and waiting for the charge stored by each capacitor 106 to dissipate.

With respect to FIGS. 6-8, switches 124 are merely provided as exemplary techniques for electrically grounding components of a memory array. Those in the art will recognize that other components and circuits may be employed to ground the wordlines WL or bitlines BL in accordance with the present techniques. Such modification is within the ordinary skill in the art and is contemplated by the present disclosure. As discussed above with reference to FIGS. 2A and 2B, these methods for disabling read access (FIGS. 6 and 7) and accelerated erasing of data (FIG. 8) may be selectively applied to an entire memory array or to any portion thereof.

Figure 9:
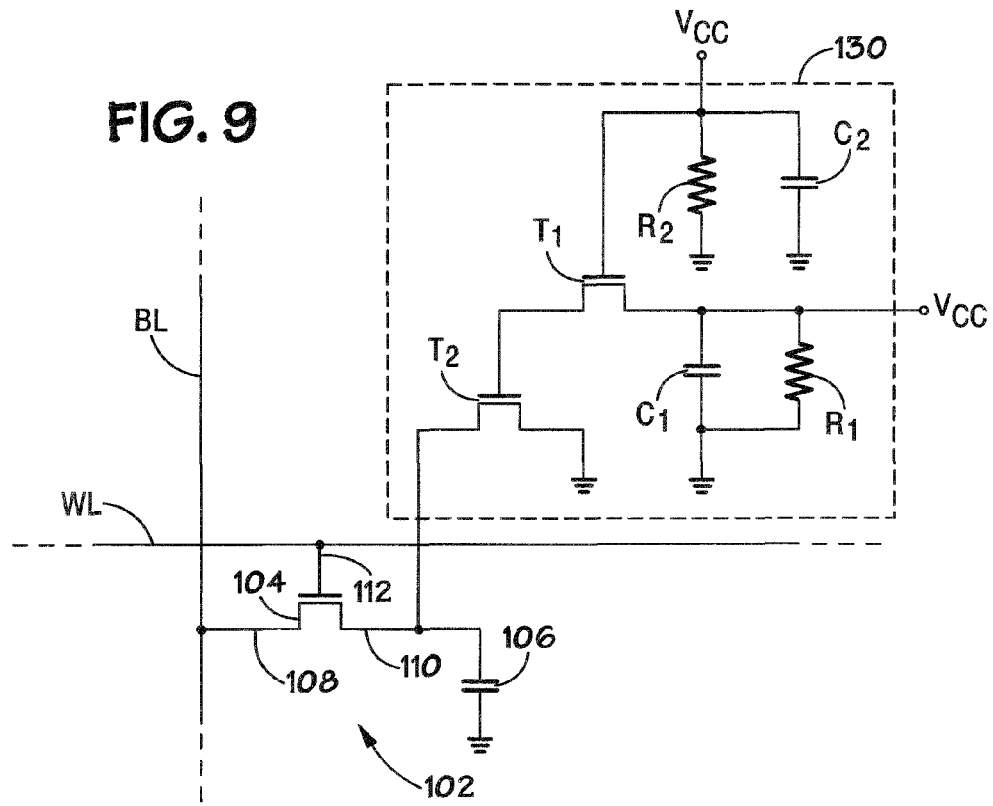
FIG. 9 illustrates an exemplary technique for purging data from a memory cell upon providing power to, or removing power from, a memory device in accordance with the present embodiments.

Another exemplary circuit for accelerated erasing of data from a memory cell 102 is depicted in FIG. 9. In this illustration, the components of the memory cell 102 are shown in a similar arrangement as in FIGS. 5-8 and includes transistor 104, with terminals 108, 110, and 112, and capacitor 106. The exemplary erasing circuit 130 comprises resistors $R_1$ and $R_2$, capacitors $C_1$, and $C_2$, and transistors $T_1$ and $T_2$. The illustrated circuit configuration causes any charge stored by capacitor 106 to be discharged upon deactivation of the device, resulting in accelerated data purging. As will be understood by those skilled in the art, the circuit shown in FIG. 9 is given by way of example; any number of alternative circuits known in the art may be employed in accordance with the presently disclosed techniques for purging data from a memory cell or array upon activation and/or deactivation of the device.

In this particular configuration, the resistors and capacitors form RC circuits. As may be appreciated by those skilled in the art, the rate of discharge of capacitors $C_1$ and $C_2$ is a function of the time constant of the circuit defined by the product of the capacitance of the capacitor and the resistance of the respective resistor. Thus, in the present arrangement, the time constant of the sub-circuit comprising $R_2$ and $C_2$ may be configured to be greater than the time constant of the sub-circuit comprising $R_1$ and $C_1$. Because of the difference between the respective time constants, once power ($V_{cc}$) is removed from the circuit, capacitor $C_2$ will discharge more slowly than capacitor $C_1$, thereby activating transistor $T_1$. Activation of transistor $T_1$ consequentially activates transistor $T_2$. Upon activation of the transistor $T_2$, any charge present on the capacitor 106 passes through the transistor $T_2$ to ground, thereby erasing the memory cell contents in an accelerated fashion. As the capacitor $C_2$ discharges to the same potential as the capacitor $C_1$, the transistors $T_1$ and $T_2$ turn off, allowing the memory cell to function normally for future use.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method comprising:
   manufacturing a memory component of an electronic system, wherein manufacturing the memory component includes:
   disposing a memory array on a substrate; and
   coupling a control circuit to the memory array, wherein the control circuit is configured to selectively prevent access to data stored within the memory array upon removal of the memory component from the electronic system.

2. The method of claim 1, wherein manufacturing the memory component includes manufacturing a field-replaceable unit including the memory array and the control circuit.

3. The method of claim 1, wherein the control circuit is configured to selectively prevent access to the data stored within the memory array by actively disabling read access to the data upon removal of the memory component from the electronic system.

4. The method of claim 3, wherein the control circuit is configured to disable read access to the data by effecting grounding of at least one of wordlines or bitlines of the memory array.

5. The method of claim 1, wherein the control circuit is configured to selectively prevent access to the data stored within the memory array by actively erasing the data upon removal of the memory component from the electronic system.

6. The method of claim 5, wherein the control circuit is configured to erase the data by effecting powering of wordlines of the memory array contemporaneous with grounding of bitlines of the memory array.

7. A method comprising:
   manufacturing a memory component of an electronic system, wherein manufacturing the memory component includes:
   disposing a memory array on a substrate, the memory array including a plurality of wordlines and a plurality of bitlines;
   coupling signal interrupt circuitry to at least one of the plurality of wordlines or the plurality of bitlines, wherein the signal interrupt circuitry is configured to inhibit access to data stored within the memory array upon removal of the memory component from the electronic system.

8. The method of claim 7, wherein coupling signal interrupt circuitry to at least one of the plurality of wordlines or the plurality of bitlines includes coupling switches to the at least one of the plurality of wordlines or the plurality of bitlines, wherein the switches facilitate selective grounding of the at least one of the plurality of wordlines or the plurality of bitlines.

9. The method of claim 8, wherein the switches are configured to operate in response to signals from a control circuit of the signal interrupt circuitry.

10. The method of claim 8, wherein the switches are configured to automatically ground the at least one of the plurality of wordlines or the plurality of bitlines upon removal of the memory component from the electronic system.

11. The method of claim 7, wherein the signal interrupt circuitry is configured to inhibit access to data stored within the memory array by disconnecting a data path within the memory component.

12. A method comprising:
   setting an authentication sequence of a data security device, the data security device including a memory and data protection circuitry configured to physically disable access to the memory upon failure of an additional device attempting to access data from the memory to provide the selected authentication sequence to the data security device;

receiving a signal from the additional device attempting to the access data from the memory;

determining whether the additional device has provided the selected authentication sequence; and selectively granting or physically disabling access to the memory, via the data security device, based on the determination of whether the additional device has provided the selected authentication sequence.

13. The method of claim 12, wherein setting the authentication sequence includes receiving a programming input and setting one or more bits within a register of the data security device to select the authentication sequence.

14. The method of claim 12, wherein selectively granting or disabling access to the memory includes selectively granting or physically disabling access to a volatile memory device.

15. The method of claim 12, comprising automatically disabling access to the memory, via the data security device, upon removal of power from the data security device.

16. The method of claim 15, wherein automatically disabling access to the memory includes actively purging the data from the memory.

17. The method of claim 12, wherein physically disabling access to the memory includes grounding at least one of wordlines or bitlines of the memory.

18. A method comprising:

providing a memory component configured to store data, to sense removal of the memory component from a processor-based system, and to initiate a data security measure, in response to the removal of the memory component from the processor-based system, to inhibit access to data stored within the memory component; and coupling the memory component to the processor-based system.

19. The method of claim 18, wherein the memory component is configured to initiate at least one of the following security measures:

purging data stored within the memory component;

disabling read access to data stored within the memory component; or physically disabling the memory component.

20. The method of claim 19, wherein physically disabling the memory component includes disconnecting a data path within the memory component.

21. The method of claim 18, wherein providing the memory component includes providing a non-volatile memory device.

22. The method of claim 18, wherein providing the memory component includes providing a volatile memory device.

* * * * *